(12) United States Patent
Caron

(10) Patent No.: US 7,249,440 B2
(45) Date of Patent: Jul. 31, 2007

(54) PLANT-GROWING SYSTEM HAVING AN AERATOR

(75) Inventor: Jean Caron, St-Romuald (CA)

(73) Assignee: Universite Laval, Quebec City, Quebec (CA)

( * ) Notice: Subject to any disclaimer, the term of this patent is extended or adjusted under 35 U.S.C. 154(b) by 0 days.

(21) Appl. No.: 10/478,206

(22) PCT Filed: Jun. 14, 2002

(86) PCT No.: PCT/CA02/00906

§ 371 (c)(1),
(2), (4) Date: Nov. 28, 2003

(87) PCT Pub. No.: WO02/102141

PCT Pub. Date: Dec. 27, 2002

(65) Prior Publication Data

US 2004/0148855 A1 Aug. 5, 2004

(51) Int. Cl.
A01G 9/02 (2006.01)
(52) U.S. Cl. ........................................... 47/80; 47/66.6
(58) Field of Classification Search .................... 47/80, 47/79, 48.5, 62 A, 32.7, 70, 71, 73, 75, 66.6
See application file for complete search history.

(56) References Cited

U.S. PATENT DOCUMENTS

| 681,672 | A | * | 9/1901 | Andrews | 47/80 |
| 954,440 | A | | 4/1910 | Klemm | |
| 1,775,831 | A | * | 9/1930 | Salisbury | 47/65.5 |
| 1,778,030 | A | * | 10/1930 | Kanst | 47/48.5 |
| 1,785,430 | A | | 12/1930 | Agnell | |
| 1,952,597 | A | | 3/1934 | Lizzola | |
| 2,713,752 | A | * | 7/1955 | Sobol | 47/80 |
| 3,220,144 | A | * | 11/1965 | Green | 47/80 |
| 3,550,319 | A | * | 12/1970 | Gaines, Jr. | 47/79 |
| 3,739,523 | A | | 6/1973 | Tuffli | |
| 3,958,366 | A | | 5/1976 | Meyers | |
| 4,133,141 | A | * | 1/1979 | Lee | 47/79 |
| 4,148,155 | A | | 4/1979 | Allen | |
| 4,149,340 | A | * | 4/1979 | DaVitoria-Lobo | 47/79 |
| 4,173,098 | A | | 11/1979 | Smith | |

(Continued)

FOREIGN PATENT DOCUMENTS

DE 806 918 6/1951

(Continued)

Primary Examiner—Son T. Nguyen
(74) Attorney, Agent, or Firm—Ogilvy Renault

(57) ABSTRACT

A container for aeration of a substrate supporting a plant with the substrate being received in a cavity of the container so as to bury a device positioned in the cavity such that gas can be supplied from the device to the substrate. The device comprises a body having a peripheral wall defining an inner cavity. The peripheral wall has a portion permeable to gas such that a gas can flow therethrough from the inner cavity of the body to an exterior of the device. A gas permeability of the body decreases as a function of a vertical orientation of the body. The body has an inlet adapted to receive a gas to fill the inner cavity. The device is buried in a predetermined position with respect to the vertical orientation, such that greater amounts of gas can be supplied to the substrate relatively to a depth of the device.

13 Claims, 2 Drawing Sheets

U.S. PATENT DOCUMENTS

| | | | |
|---|---|---|---|
| 4,175,356 A | | 11/1979 | Allen |
| 4,216,623 A | * | 8/1980 | Silver .......................... 47/80 |
| 4,236,351 A | | 12/1980 | Smith |
| 4,528,774 A | | 7/1985 | Skaife |
| 5,103,584 A | * | 4/1992 | Whisenant .................... 47/79 |
| 5,159,779 A | * | 11/1992 | Johnson ........................ 47/61 |
| 5,385,590 A | | 1/1995 | Sledge |
| 5,615,517 A | | 4/1997 | Smith |
| 5,692,338 A | | 12/1997 | Rose |
| D402,861 S | | 12/1998 | Rose |
| D402,862 S | | 12/1998 | Rose |
| 5,921,025 A | | 7/1999 | Smith |
| 6,070,360 A | * | 6/2000 | Liao et al. .................... 47/80 |

FOREIGN PATENT DOCUMENTS

| | | |
|---|---|---|
| DE | 90 12 4685 | 12/1990 |
| EP | 21961 A1 * | 1/1981 |
| FR | 1205963 | 5/1960 |
| FR | 2611427 A1 * | 9/1988 |
| GB | 403460 | 12/1933 |

* cited by examiner

PLANT-GROWING SYSTEM HAVING AN AERATOR

BACKGROUND OF THE INVENTION

1. Field of the Invention

The present invention relates to plant-growing equipment. More precisely, the invention describes an apparatus to enhance aeration of a substrate supporting a plant.

2. Description of the Prior Art

Plants require fundamental elements in order to grow. (These elements are water, various nutrients, and air (more specifically, oxygen). Usually, water and nutrients are well supplied to the plant.

The roots anchor a plant to a substrate, and extract the nutrients therefrom. Artificial substrates are now widely used. They replace common soil. Unfortunately, soil oxygenation is often inadequate in many substrates. A lack of suitable oxygenation can prevent the proper development of a plant. The lack of oxygenation is exacerbated if the particles of the substrate are relatively small. A common approach to the problem is to use substrates that have large particles, but such substrates are costly. The bottom of a typical plant-growing container is often subject to a lack of oxygenation. As roots reside in the bottom of plant-growing containers, the proper oxygenation of bottom portions of containers can help in optimizing the development of plants.

In order to overcome the under-oxygenation of the roots, various solutions have been tested. One solution consists in creating aeration holes on the walls of plant-growing containers. These aeration holes then allow the natural airflow and thus the oxygenation of bordering areas of a substrate. For instance, U.S. Pat. No. 4,528,774, issued to Skaife on Jul. 16, 1985, and U.S. Pat. No. 954,440, issued to Klemm on Apr. 12, 1910, each describe plant-growing containers having perforations on their lateral surfaces supporting the substrate.

British Patent No. 403,460, issued to Roberts et al. on Dec. 28, 1933, U.S. Pat. No. 4,173,098, issued to Smith on Nov. 6, 1979, and U.S. Pat. No. 4,236,351, issued to Smith on Dec. 2, 1980, each disclose plant-growing containers defining a cavity below a substrate section. The cavity and the substrate section are separated by a perforated disk allowing an air supply to the bottom of the substrate section. Cylindrical tubes extend through the substrate section to reach the cavity and supply water thereto. Ambient air can also circulate through the cylindrical tubes to reach the cavity. Furthermore, in British Patent No. 403,460, the cylindrical tubes are perforated in their portion embedded in the substrate section, such that the substrate can be oxygenated through these perforations.

German Patent No. 806,918, issued on Jun. 21, 1951 to Kiel, and U.S. Pat. No. 1,952,597, issued to Lizzola on Mar. 27, 1934, both describe devices that are securable to an inner wall of plant-growing containers. These devices are perforated and allow the oxygenation of the substrate. These devices can take various shapes, including an upwardly flaring cone.

U.S. Pat. No. 3,958,366, issued to Meyers on May 25, 1976, discloses a plant-growing container that permits the irrigation of the substrate as well as the aeration thereof. The aeration is effected by cylindrical tubes that project from the exterior surface of the plant-growing container towards the substrate. These cylindrical tubes are perforated, such that air can be supplied to the substrate.

U.S. Pat. No. 4,175,356, issued to Allen on Nov. 27, 1979, describes a cylindrical tube having pointy ends to be inserted into the substrate of a plant-growing container. The cylindrical tube defines an inner cavity on a full length thereof, and the peripheral surface of the cylindrical tube is perforated, such that the substrate into which the cylindrical tube is inserted can be oxygenated by the air contained in the inner cavity. The pointy ends of the cylindrical tube are also perforated, such that ambient air can fill the inner cavity. The cylindrical tube is simply inserted into the substrate and the pointy ends facilitate the insertion.

U.S. Pat. No. 5,692,338, issued on Dec. 2, 1997 to Rose, describes a device similar to that of U.S. Pat. No. 4,175,356 in that the device can be inserted into the substrate by a pointy end. However, the device disclosed in U.S. Pat. No. 5,692,338 is shaped as a square-based pyramid, inverted when inserted into the substrate.

In the above-cited references, the diffusion rate within the aeration structure cannot be modified, as the devices are passive (only provide diffusion of air). However, considering that the aeration demand may vary in time because of an increased soil biological activity, of the evolution of the physical properties of the soil, or of a more active root growth, devices that will improve the aeration process rapidly and efficiently must be introduced.

SUMMARY OF THE INVENTION

Therefore, it is an aim of the present invention to provide a new plant-growing container.

It is a further aim of the present invention to provide a method for assembling the new plant-growing container of the present invention.

Therefore, in accordance with the present invention, there is provided a device for aeration of a substrate supporting a plant, comprising a body having a peripheral wall with an inner surface and an outer surface, the inner surface of the peripheral wall defining an inner cavity of the body, the peripheral wall having a portion permeable to gas such that a gas can flow therethrough from the inner cavity of the body to an exterior of the body, a gas permeability of the peripheral wall of the body increasing along a given orientation of the body, the body having an inlet adapted to allow a gas to fill the inner cavity, the body being adapted to be at least partly buried in a substrate with the substrate being in contact with the outer surface of the body such that the gas can flow from the inner cavity through said portion of the peripheral wall to the substrate, wherein the device is at least partly buried in the substrate with the body in a predetermined position with respect to said given orientation, such that amounts of gas supplied to the substrate along the body increases with a depth of the device in the substrate.

Also, in accordance with the present invention, there is provided a device for aeration of a substrate supporting a plant, comprising a body having a peripheral wall with an inner surface and an outer surface, the inner surface of the peripheral wall defining an inner cavity of the body, the peripheral wall having a portion permeable to gas such that a gas can flow therethrough from the inner cavity of the body to an exterior of the body, the body being adapted to be at least partly buried in a substrate with the substrate being in contact with the outer surface of the body such that the gas can flow from the inner cavity through said portion of the peripheral wall to the substrate, the body having at least one port in fluid communication with the inner cavity, and a pressure source connected to the at least one port of the body for creating a pressure differential between the inner cavity and surroundings of a surface of the substrate to enhance a gas supply to the substrate through said portion of the peripheral wall.

Further in accordance with the present invention, there is provided a system for aeration of a substrate supporting a plant, comprising a container having a wall defining a cavity adapted to receive a substrate therein, and an aeration device as described above, the aeration device being positioned in the cavity of the container, wherein a substrate is received in the cavity of the container so as to bury at least partially the aeration device positioned in the cavity such that gas can be supplied from the aeration device to the substrate.

Still further in accordance with the present invention, there is provided a method for providing aeration to a plant-supporting substrate, comprising the steps of i) providing a container having a first cavity and a funnel having perforations extending through a wall thereof, ii) placing the funnel in an inverted position in the first cavity of the container so as to form a second cavity therebetween, and iii) filling the first cavity of the container outwardly of the funnel with a plant-supporting substrate with a maximal level of substrate being below an open end of the funnel, such that air can be supplied from surroundings of the container to the second cavity and through the perforations to the substrate.

Still further in accordance with the present invention, there is provided a method for providing enhancing aeration to a plant-supporting substrate, comprising the steps of i) providing a body having a gas permeable peripheral wall defining an inner cavity, ii) burying the body at least partially in a substrate, and iii) creating a pressure differential between the inner cavity and the substrate to enhance a supply of air from the inner cavity to the substrate.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
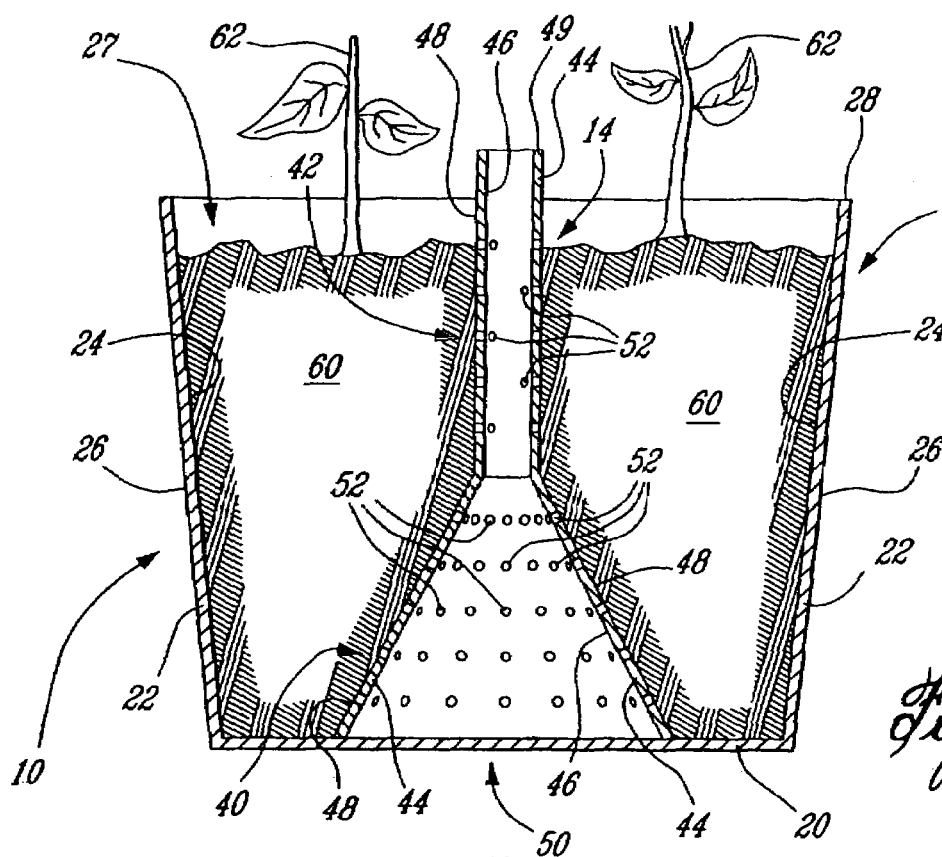
FIG. 1 is a vertical cross-sectional view of a plant-growing container in accordance with the present invention.

Referring to the drawings, and more particularly to FIG. 1, a plant-growing container in accordance with the present invention is generally shown at 10. The plant-growing system 10 has a container 12 and an aeration device 14. The container 12 is a typical container defining an inner cavity accessible from an open top end thereof, such that a substrate can fill the inner cavity so as to support a plant. More precisely, the container 12 is shown having a base 20 and a peripheral wall 22. The peripheral wall 22 has an inner surface 24 and an outer surface 26, and defines an inner cavity 27 of the container 12 with the base 20. A top end 28 of the container 12 is open, such that the inner cavity 27 can be accessed. Although the container 12 is illustrated as being of inverted frusto-conical shape, it is obvious that other shapes of container can be used in the present invention. For instance, the container 12 may have a cylindrical shape, a rectangular prism shape, etc.

The aeration device 14 is shown having a lower flared portion 40 and an upper cylindrical portion 42. The flared portion 40 and the cylindrical portion 42 are integral, such that the aeration device 14 is shaped as an inverted funnel. The aeration device 14 has a peripheral wall 44 with an inner surface 46 and an outer surface 48. The inner surface 46 defines an inner cavity 50, and the aeration device 14 is open at top and bottom ends thereof, such that the inner cavity 50 can be accessed thereby. The peripheral wall 44 defines a plurality of perforations 52 that extend from the inner surface 46 to the outer surface 48. The aeration device 14 is shown centered in the container 12, but may obviously be off-center.

The aeration device 14 is positioned in the container 12 to form the plant-growing system 10, with the flared portion 40 sitting on the base 20 of the container 12. A top end 49 of the cylindrical portion 42 preferably extends above the top end 28 of the container 12. Once the aeration device 14 is positioned in the container 12, a substrate 60 fills the volume of the inner cavity 27 of the container 12 that is not occupied by the aeration device 14. Therefore, the inner cavity 50, also known as chamber, of the aeration device 14 remains filled with air while the container 12 has the substrate 60 therein. Plants 62 are supported by the substrate 60. As the open end 49 of the cylindrical portion 42 is preferably above the top end 28 of the container 12, the open end 49 will not be buried or clogged by the substrate 60. Therefore, air in the inner cavity 50 of the aeration device 14 can circulate outwardly through the perforations 52 so as to supply air to the substrate 60 and the plants 62. Ambient air is free to circulate through the cylindrical portion 42 by the open end 49, such that fresh air can be supplied to the substrate 60 and the plant 62 through the inner cavity 50. The device 14 may also be completely buried in the substrate 60, and air contained in the device 14 will be diffused to the substrate 60, provided that the substrate 60 is not saturated with water. If desired, a tubing (not shown) can be connected to the top end 49 to enhance the air exchange through the aeration device 14.

The configuration of the aeration device 14 enables air to be provided to air-depleted areas (anaerobiosis) of the plant-growing container 10. Air-depleted areas are typically created in bottom parts of containers, because the substrate is more compact in the bottom of containers as it bears the weight of upper layers of substrate and of the plants. Therefore, the growth of the roots located in the bottom of typical containers will not be optimized. The flared portion 40 of the aeration device 14 provides a gradually increasing amount of air-exchange areas, i.e., the perforations 52, as a function of the depth of the aeration device 14 in the container 12. Furthermore, the flared portion 40 will occupy a greater volume of the container 12 with respect to the volume of the substrate 60 as a function of the depth. In other words, the deeper the substrate 60 is positioned in the container 12, the more the aeration device 14 will supply air thereto. Therefore, the perforations 52 help balance the presence of air in the substrate 60.

Although providing perforations in a funnel and inserting the funnel in an inverted position into a container is the preferred way of fabricating the plant-growing system 10, other fabrication methods are contemplated. For instance, providing a funnel in a porous material allowing air circulation therethrough is another alternative in accordance with the present invention.

The aeration device 14 advantages the bottom part of the plant-growing system 10 and thus optimizes the root development through the substrate volume of the container 12. An appropriate ratio between the varying diameter of the flared portion 40 and the diameter of the container 12 must be selected in order to effectively provide a homogeneous concentration of air in the substrate 60. Also, the slope of the flared portion 40 must be wisely chosen. For a fixed density of perforations 52 in the peripheral wall 44, a small slope will allow less oxygenation than an important slope. An important slope will lead to a larger portion of the container 12 being occupied by the aeration device 14, whereby less substrate 60 can be retained in the container 12. It is therefore important to adapt the aeration device 14 in order to efficiently provide air to the substrate 60. The density of the perforations 52 in the peripheral wall 44 of the aeration device 14 will also be chosen to meet specific plant needs. It is pointed out that, although the flaring configuration of the aeration device 14 is preferred for the above-described reasons, the important feature is to provide an increasing amount of air-exchange surface with the increasing depth.

Figure 2:
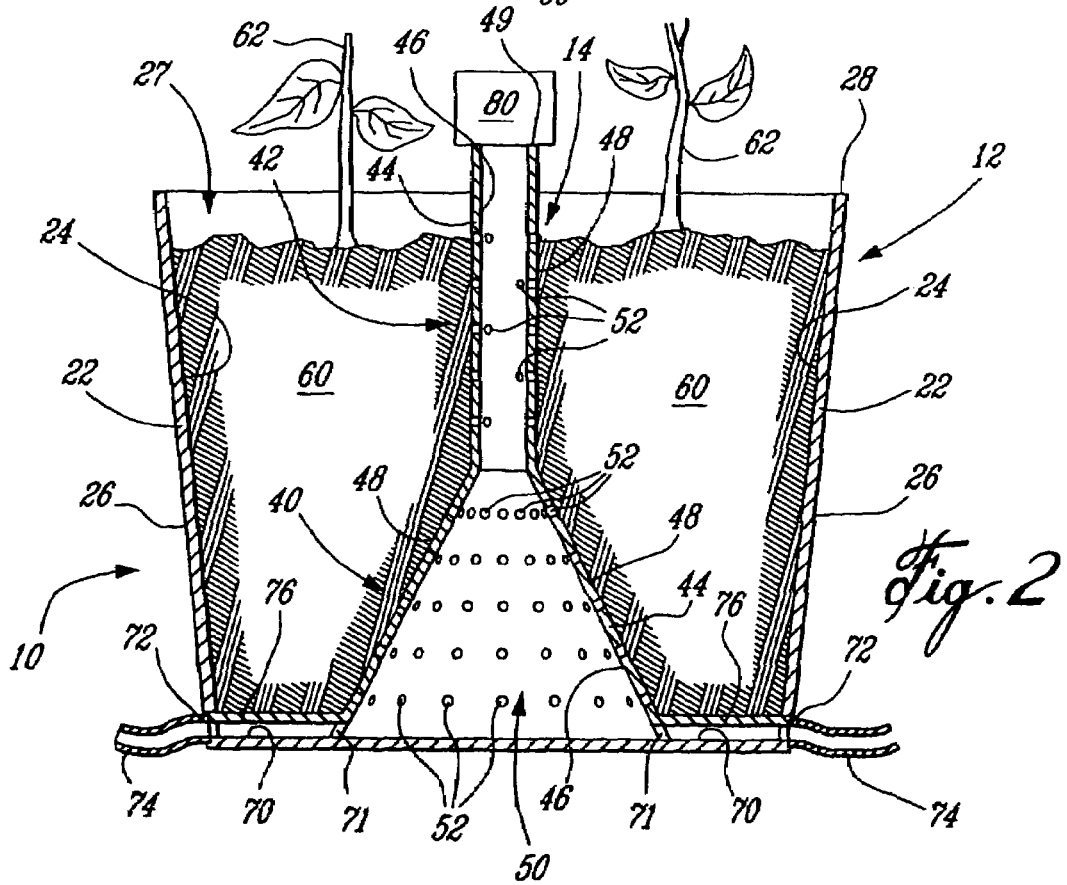
FIG. 2 is a vertical cross-sectional view of the plant-growing container provided with additional components and features.

Referring to FIG. 2, the plant-growing system 10 is shown provided with optional elements that enhance the aeration of the substrate 60. Channels 70 are positioned on the base 20 of the container 12 and are in fluid communication with the aeration device 14 through inlets 71. Although two channels 70 are illustrated in FIG. 2, it is obvious that a varying number of channels 70 can be provided. The channels 70 extend between the aeration device 14 and the peripheral wall 22 of the container 12. Therefore, as shown in FIG. 2, ends 72 of the channels 70 can be connected to an air source, such as supply hose 74. For instance, the ends 72 can be tapped for operating engagement with a hose adapter (not shown). The channels 70 are shown having perforations 76 such that air flowing through the channels 70 can be directed to the substrate 60. The supply hose 74 creates a flow of air in the inner cavity 50 of the aeration device 14.

The open end 49 of the cylindrical portion 42 allows air to exit from the inner cavity 50. A flow control device 80, such as a venturi or a control valve, is shown mounted to the open end 49 of the cylindrical portion 42 so as to control the exit of air flowing through the inner cavity 50 of the aeration device 14. In the case where the flow control device 80 is an outlet control valve, a positive pressure can be accumulated in the inner cavity 50 via the supply hose 74 to accelerate the transfer of air to the substrate 60 and the roots of the plant 62. Alternatively, a negative pressure can be created by having a suction device (not shown) connected to the supply hose 74 to cause a flow of air to the inner cavity 50, and force air exchange with the substrate 60. The circulation of air enables an air supply to the substrate 60 by convection of air, as opposed to diffusion of air for containers without forced-air circulation. A venturi can also be used to create a negative pressure in the inner cavity 50 without the need for a pressure source to be connected to the device 14. This inner suction will cause an upward motion of the air in the device 14, thereby enhancing the air exchange between the inner cavity 50 and the substrate 60.

Figure 3:
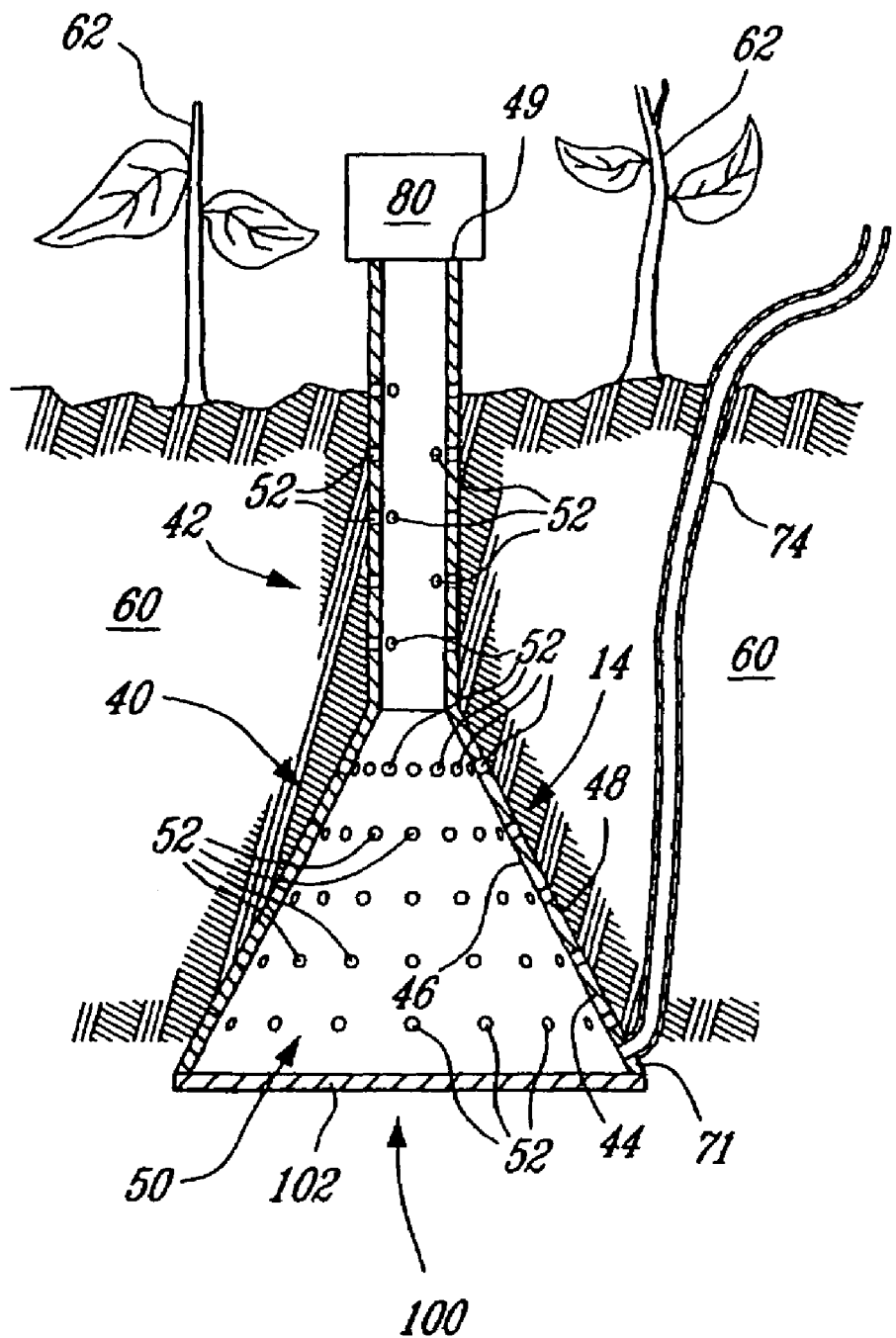
FIG. 3 is a vertical cross-sectional view of an aeration apparatus in accordance with another embodiment of the present invention.

Referring to FIG. 3, an aeration apparatus in accordance with another embodiment of the present invention is generally shown at 100. The aeration apparatus 100 has the aeration device 14 as described for FIGS. 1 and 2, with a bottom plate 102 positioned on a bottom surface thereof, so as to define a bottom portion of the inner cavity 50. Like numerals between FIGS. 1-2 and FIG. 3 will designate like elements.

The aeration apparatus 100 is positioned directly in a substrate 60. Therefore, the aeration apparatus 100 can be used in fields rather than in containers, to supply air to substrates. A plurality of the aeration apparatuses 100 can be connected to a same pressure source (not shown) in a network of aeration apparatuses 100 in a field.

The aeration device 14 can be fabricated and sold separately from the container 12. The aeration device 14 is generally made of plastic or any other substantially rigid material that is preferably moldable. Alternatively, it can be made of a semi-rigid geotextile.

If the aeration device 14 is to be sold separately from the container 12 and has the options illustrated in FIG. 2, the channels 70 can either be molded directly in the container 12, or can include tubing (not shown) connected to the aeration device 14 and adapted to be secured to through bores (not shown) in the peripheral wall 22 of the container 12. The plant-growing system 10 can be used for domestic uses, industrial uses and in nurseries.

I claim:

1. A plant-growing device comprising a container at least partly filled with a particulate substrate and a plant substrate aerator at least partly buried in said particulate substrate the plant substrate aerator comprising a body having a peripheral wall with an inner surface and an outer surface, the body having an upper cylindrical portion and a lower conical portion flaring downwardly from said upper cylindrical portion, the inner surface of the peripheral wall defining an inner cavity of the body, the inner cavity being in gas-exchange relationship with the surroundings of said body through a permeable portion of said peripheral wall, said permeable portion having an increasing permeability towards a lower end of the lower conical portion, the body having an inlet defined in said lower conical portion and adapted to allow a gas to fill the inner cavity, said inlet being connected in fluid communication with at least one fluid passage defined in a bottom portion of the container, the permeable portion of the body being at least partly located below a top surface of the particulate substrate such that at least part of the gas flows from the inner cavity through said permeable portion of the peripheral wall directly into the particulate substrate, wherein said lower conical portion of the body of the plant substrate aerator extends into the particulate substrate, such that amounts of gas supplied to the particulate substrate along the body increases with a depth of the plant substrate aerator in the particulate substrate, and gas convection means for creating a pressure differential between the inner cavity and the particulate substrate to create a convective flux therebetween, and wherein said inner cavity has an outlet at said upper cylindrical portion, said outlet being provided with a flow control device for controlling the exit of gas from the inner cavity through the outlet.

2. The device according to claim 1, wherein said gas permeability is created by perforations in said portion of the peripheral wall.

3. The device according to claim 1, wherein die lower conical portion has an inverted funnel shape.

4. The device according to claim 1, wherein said gas convection means comprise a venturi to create a negative pressure in the inner cavity to enhance the gas supply to the substrate through said portion of the peripheral wall.

5. The device according to claim 1, wherein said gas convection means comprise a pressure source, the pressure source being connected to the inlet via said at least one fluid passage of said container such that a pressure differential is created between the inner cavity and surroundings of the surface of the substrate to enhance a gas flow through said portion of the peripheral wall to the substrate.

6. The device according to claim 5, wherein a venturi is connected to the inlet, and wherein the flow control device comprises a control valve.

7. The device according to claim 1, wherein the plant substrate aerator is not completely buried in the substrate.

8. A plant growing device comprising:
  a container at least partly filled with a particulate substrate, the container having a fluid passage defined through a wall thereof;
  a plant substrate aerator having a body having a peripheral wall with an inner surface and an outer surface, the inner surface of the peripheral wall defining an inner cavity of the body, the inner cavity being in gas-exchange relationship with the surroundings of the body through a permeable portion of said peripheral wall, the body being at least partly buried in the particulate substrate with the particulate substrate being in contact with the outer surface of the body and the permeable portion extending into the particulate substrate such that at least a portion of the gas flows from the inner cavity through said portion of the peripheral wall directly into the particulate substrate, the body having at least one inlet port at a lower end portion thereof in fluid communication with the fluid passage defined through the wall of the container for supplying gas into the inner cavity, and an at least one outlet port at an upper end portion of the body;
  a pressure source connected to the fluid passage of the container for creating a pressure differential between the inner cavity and surroundings of a surface of the particulate substrate to enhance a convective gas supply to the particulate substrate through said portion of the peripheral wall; and
  a flow control device at said outlet port of the body.

9. The device according to claim 8, wherein a gas permeability of the peripheral wall of the body increases along a given orientation of the body, the plant substrate aerator being at least partly buried in the substrate with the body in a predetermined position with respect to said given orientation such that amounts of gas supplied to the substrate along the body increases with a depth of the device in the substrate.

10. The device according to claim 8, wherein said portion is permeable to gas by having a plurality of perforations extending through the peripheral wall.

11. The device according to claim 8, wherein the upper end portion of the body is tubular, and wherein the lower parts extend continuously from the upper end portion in the form of a perforated inverted funnel.

12. A system for aeration of a substrate supporting a plant, comprising:
  a container having a substantially closed bottom end and a wall defining a cavity receiving a particulate substrate therein, the container has a fluid passage defined through the wall thereof; and
  an aeration device mounted at a bottom of said cavity, the aeration device comprising a body having an upper tubular portion and a lower conical portion flaring downwardly from the upper tubular portion, the body having a peripheral wall with an inner surface and an outer surface, the inner surface of the peripheral wall defining an inner cavity of the body, the inner cavity being in fluid flow communication with the fluid passage of the container for allowing air to flow into the inner cavity, the inner cavity being in direct gas-exchange relationship with the particulate substrate from below a top surface thereof through a permeable portion in the peripheral wall, the permeability of the permeable portion increasing towards said substantially closed bottom end, the body being at least partly buried in the particulate substrate with the substrate being in contact with the outer surface of the body such that a gas path extends from the inner cavity through said permeable portion of the peripheral wall to the particulate substrate, the body having an outlet defined in said upper tubular portion, said outlet being provided with a flow control device for controlling the flow of air therethrough.

13. The system according to claim 12, wherein the fluid passage of the container extends along the closed bottom end and is perforated along the length thereof for allowing air to flow therefrom directly into the particulate substrate.

* * * * *